(12) United States Patent
Rauscher et al.

(10) Patent No.: US 8,754,785 B2
(45) Date of Patent: *Jun. 17, 2014

(54) IMAGE DATA COLLECTION FROM MOBILE VEHICLES WITH COMPUTER, GPS, AND IP-BASED COMMUNICATION

(75) Inventors: Frank Rauscher, New Tripoli, PA (US); Carl E. Werner, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 673 days.

This patent is subject to a terminal disclaimer.

(21) Appl. No.: 12/963,180

(22) Filed: Dec. 8, 2010

(65) Prior Publication Data

US 2011/0074953 A1    Mar. 31, 2011

Related U.S. Application Data

(63) Continuation of application No. 11/413,193, filed on Apr. 28, 2006, now Pat. No. 7,872,593.

(51) Int. Cl.
*G08G 1/01* (2006.01)
*G08G 1/09* (2006.01)
*H04N 7/18* (2006.01)

(52) U.S. Cl.
USPC ........... 340/933; 340/905; 348/135; 348/139; 348/148; 348/159

(58) Field of Classification Search
USPC ........... 340/933, 905; 348/135, 139, 148, 159
See application file for complete search history.

(56) References Cited

U.S. PATENT DOCUMENTS

| | | | |
|---|---|---|---|
| 5,185,667 A | 2/1993 | Zimmermann | |
| 6,795,113 B1 | 9/2004 | Jackson et al. | |
| 6,810,152 B2 | 10/2004 | Endo et al. | |
| 7,872,593 B1 * | 1/2011 | Rauscher et al. | ............. 340/933 |
| 2004/0008255 A1 | 1/2004 | Lewellen | |
| 2004/0056954 A1 | 3/2004 | Crandall et al. | |
| 2004/0252193 A1 | 12/2004 | Higgins | |
| 2005/0062869 A1 | 3/2005 | Zimmermann et al. | |
| 2005/0088519 A1 | 4/2005 | Brookins | |
| 2005/0132414 A1 | 6/2005 | Bentley et al. | |
| 2007/0024707 A1 | 2/2007 | Brodsky | |
| 2007/0127787 A1 | 6/2007 | Castleman et al. | |

FOREIGN PATENT DOCUMENTS

WO    2005081249    9/2005

* cited by examiner

*Primary Examiner* — Jennifer Mehmood
*Assistant Examiner* — Omar Casillashernandez
(74) *Attorney, Agent, or Firm* — Parks IP Law LLC; Mickki D. Murray, Esq.

(57) ABSTRACT

A system and method to capture a plurality of images and store the captured images. The system has multiple camera systems capable of transmitting image data. At least one camera system is equipped with an apparatus for determining location coordinates such as GPS. A computer system monitors location coordinates, retrieves image data from the camera systems, and stores the image data into a file. A contiguous array of location coordinates is entered and the computer system locates camera systems within the contiguous array of location coordinates; retrieves image data from the located camera systems; and files the image data taken from each of the camera systems to obtain a file of image data. The system provides the ability to serially interleave frames or video captured from multiple sources.

20 Claims, 6 Drawing Sheets

IMAGE DATA COLLECTION FROM MOBILE VEHICLES WITH COMPUTER, GPS, AND IP-BASED COMMUNICATION

CROSS REFERENCE TO RELATED APPLICATION

This application is a continuation of U.S. application Ser. No. 11/413,193, filed Apr. 28, 2006 (now U.S. Pat. No. 7,872,593), the entirety of which is herein incorporated by reference.

FIELD OF INVENTION

The invention relates to retrieving and utilizing image data from mobile vehicles and other sources.

BACKGROUND OF THE INVENTION

Originally video surveillance was based on analog technology such as closed circuit television (CCTV) and recording on video tapes. This was fine for recording an event, but such surveillance systems didn't broadcast actual live information, so such surveillance wasn't practical for monitoring locations, for instance, from a remote location to obtain real-time information. Moreover, picture quality was typically grainy and tapes needed to be changed regularly.

Other sources of video footage often have been citizens with a camera. Footage of an event may be captured by the citizen, but usually this footage is turned in to authorities or news agencies at a time after the event and is not useful as real-time information to possibly prevent a crime or terrorist act.

As technology developed, real-time video cameras replaced analog technology. For example, real-time video cameras were mounted on tope of poles for traffic surveillance. These systems became accessible through broadcast stations and then the internet. This type of surveillance allowed real-time viewing of traffic events from fixed locations. Such systems have also been set up by security firms that place video cameras inside and outside building for surveillance. However, video data obtained from stationary sources, such as traffic cameras, often are too far from the scene or facing the wrong direction. It would be difficult and expensive to provide cameras on all roads in a given area to provide full coverage.

Cameras also have been mounted in vehicles, such as police cars, for recording events. These cameras record events such as arrests and pursuits. The recording of these events provide evidence for prosecutors, but also may provide a deterrent if the suspect knows he or she is being recorded.

Real-time video data is becoming increasingly important to provide security and legal justification for court rulings, e.g., subpoenas. Real time video data can provide information from an event such as a scene of a crime, a car accident, terrorist activity, and the like. Law enforcement, crime investigators, and terrorist specialists, for example, can use real time video data to catch criminals or prevent crimes or terrorist acts.

It is therefore desired to collect real-time video data feed from several sources via communications and then integrate the data into a composite to determine a sequence of events such as at a scene of a crime, a car accident, a terrorist event, and the like, or to compare real time video to archived video or still picture data to identify unusual or out-of-place objects.

BRIEF SUMMARY OF THE INVENTION

Aspects of the invention include a system for capturing a plurality of images, such as of an object or a geographic area, and storing a file of images. Further aspects include multiple camera systems, such as IP-based camera systems or IPIX camera systems, the camera systems capable of transmitting image data. Further aspects include at least one camera system being equipped with an apparatus for determining location coordinates such as a GPS. Further aspects include a computer system capable of monitoring location coordinates, retrieving image data from the camera systems, and/or storing the image data in a file. In further aspects, the computer system is capable of, upon entry of a contiguous array of location coordinates, locating at least one camera system having location coordinates within the contiguous array of location coordinates; retrieving image data from the at least one located camera system, and storing the image data taken from each of the camera systems.

In further aspects, the computer system can locate a plurality of the camera systems in mobile vehicles, respectively and can monitor the location coordinates continuously or on demand by the computer system.

In further aspects, the computer system can access a database having archived images, for example of objects or geographic areas, for comparison with the image data from the camera systems; can filter images to eliminate images; and/or can retrieve images in real-time. The image data can be a video stream.

In further aspects, at least one of the camera systems can constantly record images and the recorded images can be retrievable by the computer.

Another aspect of the invention is a method for obtaining and filing images comprising the steps of receiving input into a computer system including a contiguous array of location coordinates; polling camera systems in the vicinity of the contiguous array of location coordinates; retrieving image data from the camera systems; filtering the image data for content; and creating a file of filtered image data.

Further aspects include comparing the image data with archived images; obtaining image data from at least one camera system located on a mobile vehicle; obtaining image data from a plurality of the camera systems located in mobile vehicles, respectively; continuously monitoring the location coordinates; and/or filtering the image data to eliminate images, for example, images not containing an object or geographic area.

Further aspects include retrieving the image data in real-time. Other aspects include at least one of the camera systems constantly recording images; the recorded images being retrievable by the computer. The image data may comprise frames, video, or both. The method may also serially interleave the image data from multiple sources.

DETAILED DESCRIPTION OF THE INVENTION

Soon, many, if not all, mobile vehicles will have some type of communication system e.g., wireless internet access, as well as GPS or other type of location capability. The present invention takes advantage of mobile vehicles that have cameras, GPS, and communication systems, to transmit time, space, and video information. (GPS will be discussed for convenience, but any appropriate location devices, such as an electronic compass, triangulation device, radar, sonar, or combination of location devices is contemplated.) The information is retrieved, filtered, and filed and may be compared with information taken from other mobile vehicles to provide a set of images of for example a specified location. The information may also be compared with archived information, for example, to find objects in real-time images that are not present in the archived images.

The present invention provides the ability for interested agencies, e.g. the Port Authority, Federal Transportation Agency, and other government agencies on the federal, state, and local level, to capture a constant or semi-constant image data from any geographic point in which mobile vehicles are passing or have recently passed. The system may be used for monitoring a geographic area on a periodic basis or for monitoring the geographic area on an as-needed basis.

The mobile vehicle may be any suitable mobile vehicle on which a camera and GPS may be mounted. Such vehicles include, but are not limited to, cars, trucks, buses, motorcycle, bicycles (and other two-wheeled vehicles), boats, trains, airplanes, helicopters, and satellites.

Figure 1:
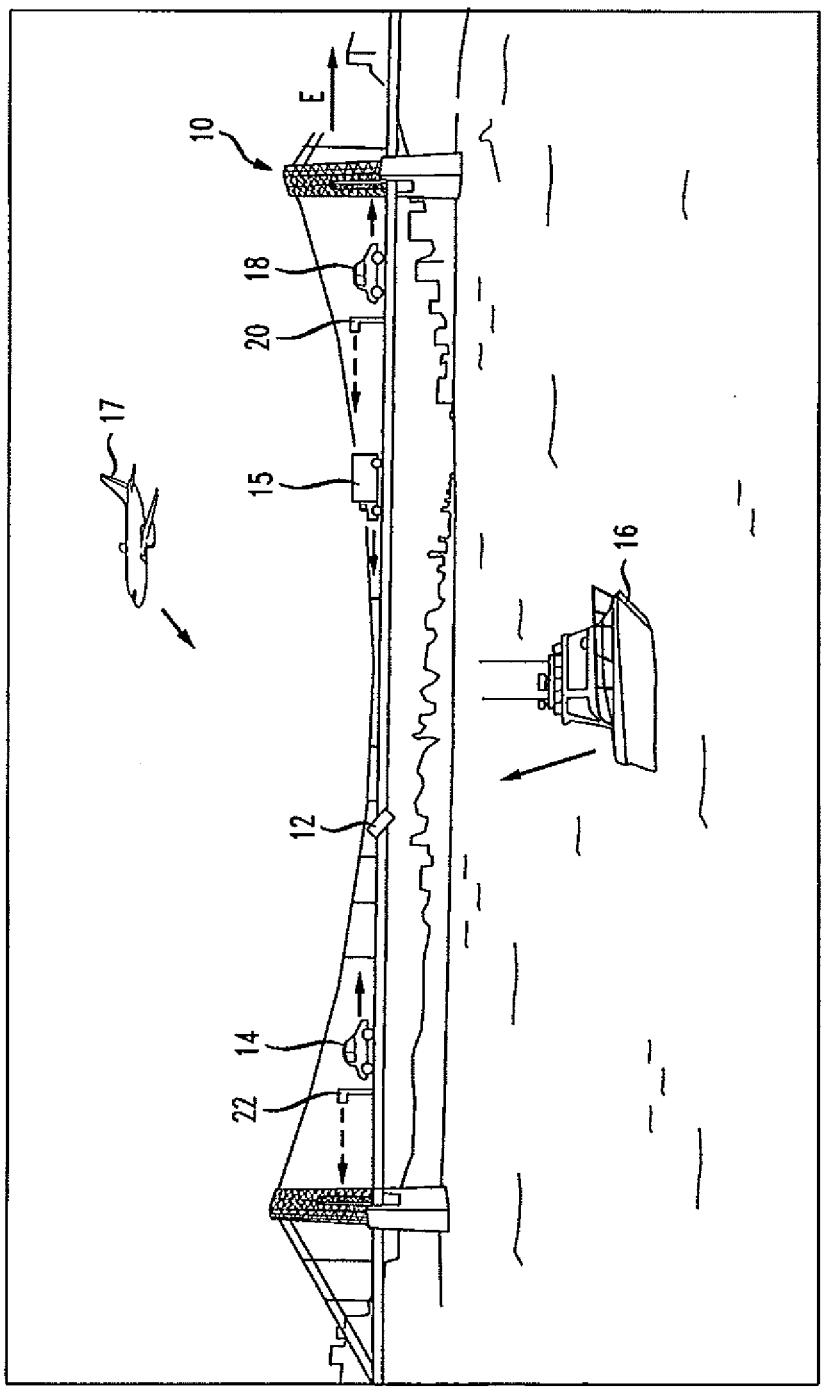
FIG. 1 is a graphic representation of several vehicles moving on, under, or over a bridge in accordance with an embodiment of the invention.

For example, FIG. 1 shows a graphical representation of a bridge 10. Information is desired on an object 12 discovered on the bridge. Based on GPS data, vehicles located near or on the bridge are accessed and images retrieved from cameras on the vehicles. For example, vehicle 14, e.g. a car, is moving east on the bridge and vehicle 15, e.g. a truck, is moving west on the bridge. Both of these vehicles are heading toward object 12 and images from cameras mounted in these vehicles may be able to provide information on the object. Vehicle 16, e.g. a boat, is heading toward the bridge and images from cameras mounted in this vehicle also may be able to provide information on the object. In addition, a top view of the bridge may be obtained from vehicle 17, a plane, helicopter, or satellite having its own camera system and GPS. Vehicle 18, on the other hand, is moving away from the object, and image data taken from a camera on this vehicle may not be useful (unless this vehicle, for example, has IPIX camera or a camera mounted to take images from behind. The images taken from any or all of vehicles 14, 15, 16 and 17 may be retrieved, filtered, and compared with images taken from still cameras mounted on posts 20 and 22. In this case, camera 20 is mounted to view the main body of the bridge possible providing useful information whereas camera 22 is mounted to view the entrance of the bridge and may not provide useful information. In addition, archived images may provide comparative images. Thus, the images and information associated with the images (such as focal length, compass headings, etc.), collectively referred to as image data, from all of the sources on or near the bridge, are retrieved and filtered to provide a file of images of the object on the bridge.

Figure 2:
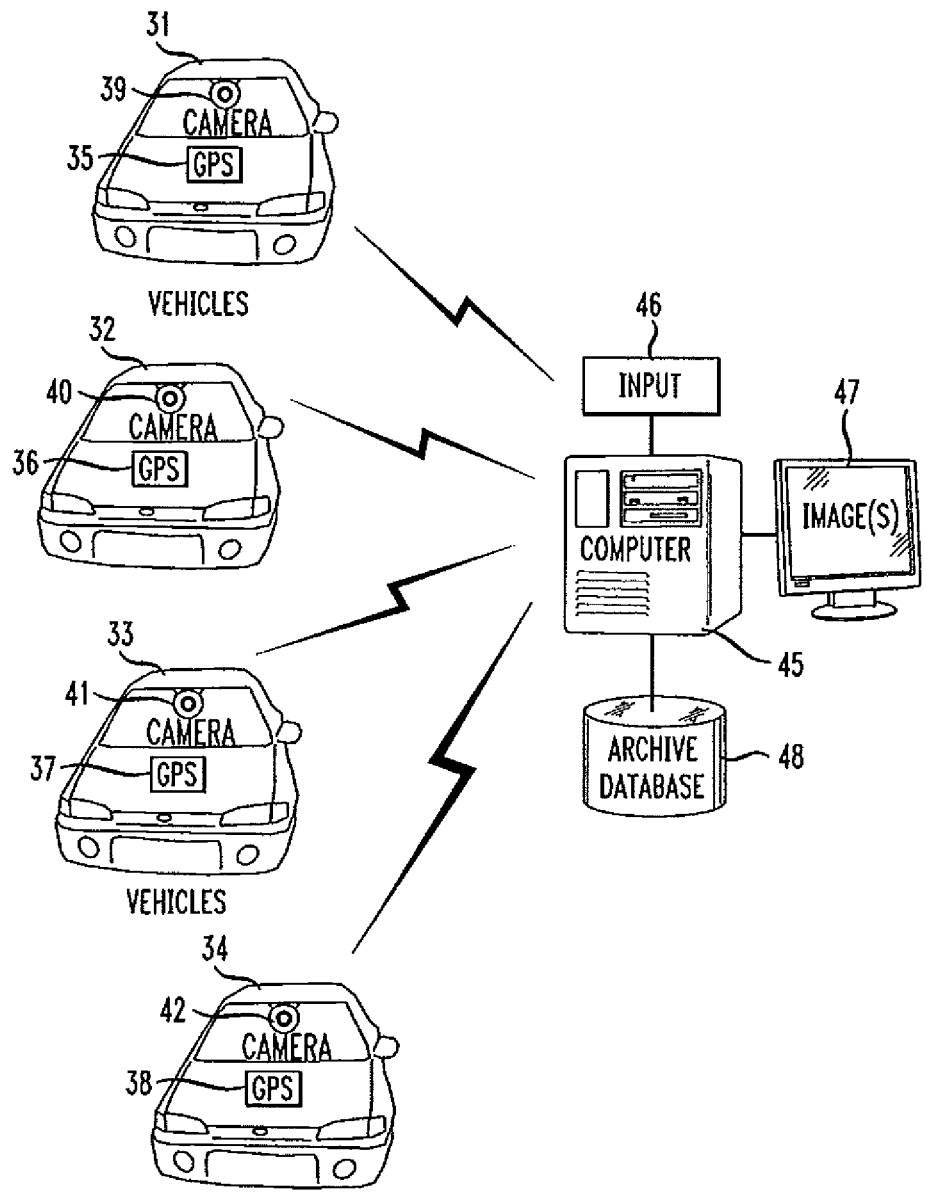
FIG. 2 is a schematic of an embodiment of the invention.

FIG. 2 shows a schematic of the operation of the system of the present invention. multiple vehicles 31, 32, 33 and 34, each have a apparatus for determining location coordinates such as GPS 35, 36, 37 and 38, respectively, and a camera system, 39, 40, 41 and 42, respectively. A central computer 45 has a device to input information 46 and a screen output to view images 47. A location of an object, for example, is inputted into input device 46 by wireless communication, the computer accesses the GPS (or other suitable apparatus) of vehicles within its system and determines which vehicles are in the vicinity of the object. Once determined, by wireless communication, the computer accesses the camera system of the relevant vehicles and downloads the image data from each of the camera systems of the relevant vehicles. The computer filters the image data for relevant images and forms a file based on the relevant images to provide visual information 47 of the object. The computer may also use archived information from database 48 for comparison purposes.

Figure 3:
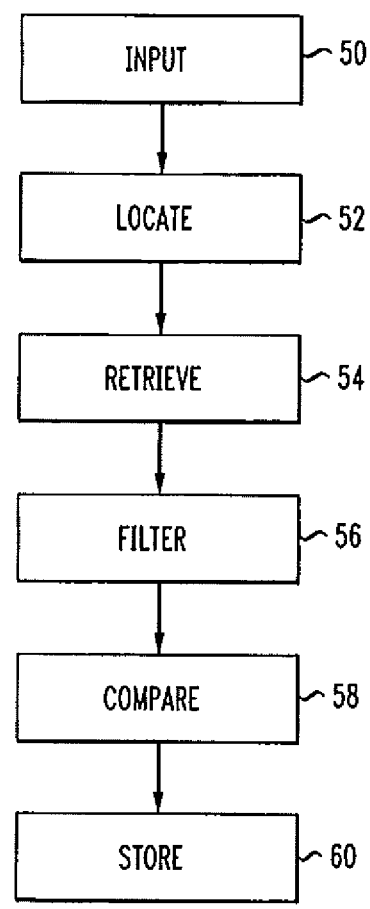
FIG. 3 is a flowchart of an embodiment of the invention.

A flowchart of one embodiment of the invention is shown in FIG. 3. A contiguous array of desired location coordinates is inputted into a computer 50. The contiguous array of location coordinates defines a certain area or region of interest. Vehicles having camera systems in the vicinity of the contiguous array of location coordinates are located 52. Images are retrieved from these vehicles 54. The images are filtered for content 56; compared 58 with each other or with archived pictures, and then stored.

A camera system in accordance with the invention includes any suitable camera mounted on a mobile vehicle that records digital video images, digital photograph images, or both. The camera system may also be an infrared camera or any other system that records images based on head, for example. Such systems would be useful at night when there is little light available. In addition to, or alternative to, a camera system, acoustic systems may be used to record sounds or vibrations. Other systems may be used to record environment conditions such as smog, temperature, and the like.

The camera system includes means to transmit image data, for example, to a computer (microprocessor) installed in the vehicle or to transfer image data to a receiver located in an area remote from the camera. Such camera systems and corresponding software are commercially sold such as IP-based camera systems and IPIX camera systems.

Suitable cameras are typically mounted on the dashboard but also may be integrated into the body of the vehicle. The camera should have stabilization features to suppress vibrations, etc.

The camera may record continuously or intermittently, such as every 1-10 seconds, or may record when instructed by the computer. The camera should be able to record at high speed to eliminate poor quality images.

The camera may have a fixed lens setting and focal length, or may have adjustable lens settings and focal lengths that operate automatically, manually, or both. The camera system includes means to record the lens settings, focal length, tilt and pan and transmit the information along with the images as image data. Image data may also include the date, time of day, compass heading of the camera, and weather conditions such as temperature and barometric pressure.

For example, an IP-based or network video camera mounted on the hood of a car can take real-time video and feed the image data stream to a computer remote from the vehicle. IP-based or network cameras are readily available and utilize existing computer networks to integrate high-quality video imaging. Such cameras feature built-in web servers. An IP address within the camera itself can be accessed through any standard web browser to view the camera in operation. The cameras are highly configurable and feature options such as image compression. The cameras also offer security features such as multiple password access to allow a variety of authorized personnel to access the camera.

The digital video can go live over the Internet or a closed network for surveillance and provide clearer, crisper images that can be tracked and manipulated easily. Digital video surveillance allows the viewer to easily zoom in on images, track particular scenes, and enhance video features.

Suitable cameras also include IPIX cameras. Such cameras permit one to take a virtual tour of an area where the camera is located. IPIX cameras contain fish eye lenses which can capture a whole sphere. Using IPIX cameras avoid the pitfall of fixed cameras since at least some portion of a captured image at a given latitude and longitude may be of interest to the requestor. Attention is drawn to U.S. Pat. Nos. 5,185,667; 5,990,941 and 6,795,113, which are hereby incorporated by reference in their entirety. In particular, FIG. 11 of U.S. Pat. No. 6,795,113 describes the use of an IPIX camera moving along an axis A and taking images as the camera moves providing a virtual tour of the surrounding area. The IPIX camera may be set to record images intermittently, e.g. every second. The distorted images are un-warped and may be filtered to obtain the desired images.

The apparatus for determining location coordinates, for example the GPS, may be a portable unit or a unit installed in the vehicle. The GPS should be capable of transmitting location data to a computer installed in the vehicle or be capable of transmitting the location data to a receiver in a location remote from the GPS. Location data from the GPS includes longitude, latitude, altitude, and time. The GPS may also be used to transmit weather conditions such as temperature, wind speed, and barometric pressure.

Alternative to, or combined with, a GPS, an electronic compass may be used. Such compasses may display several compass readings and have clock and timer. Other systems contain alerts at 35° F. to warn of freezing road conditions.

In addition radar, sonar, or other distance recording devices may be used to collect location data from the vehicle.

The location data from the GPS or other sources and the image data from the camera systems may be combined in a computer within the vehicle and then transmitted to a remote location or may be independently transmitted to a remote location.

The combination of image data and location data from the camera system and the GPS, respectively, allows the combined data to be compared with combined data taken from other vehicles to form a file of real-time images to view independently, collectively, or in sequence.

The data from the camera system and GPS may be transmitted continuously or on an as-needed basis. The camera system may be constantly recording images or may be turned on either from a computer within the vehicle or remotely.

The present invention utilizes the camera system and GPS data to gather intelligence information from several sources and combine the information into an accessible file and/or compare the information to archived information. The file may include data of the same location from several different perspectives, the same location at sequential times, or both.

The information is transmitted to a main computer, for example. The main computer may be at a stationary site or may be a mobile site such as a transport van. Access to the main computer may be at the computer site or remotely. For example, police may be able to access the information from their cruisers, or one vehicle may be able to access information from a vehicle further along the road to view road conditions and traffic information. This allows a driver, for example, to seek alternative routes if traffic is snarled along a certain route.

For example, on heavily traveled roads, there is a constant stream of traffic going past every point at any given time. In accordance with the invention, multiple vehicles are equipped with an IP-based camera system for video recording and a GPS to record location. While traveling along the road, the camera system in each vehicle records the time for each video frame captured. The information is transmitted to a location remote from the vehicle such as a main computer. The video information is coordinated with GPS information to provide the exact location of the vehicle either in a computer in the vehicle or at the location remote from the vehicle.

The computer retrieves the GPS and video information, essentially a collection of video screen sets from a set of different vehicles passing the same point, and combines the sets into a file for suitable uses such as viewing the video clips of a given location, splicing multiple images together, comparing images with archived images, or any other uses available from software.

For example, the information can include the same point at different angles and at different times and displayed on multiple screens for comparison purposes. The images can be combined to show the same point at the same time, the same point at multiple times, or both. The invention allows video information to be obtained without the need of a motionless camera on the site. Alternatively, the video information can be combined with information taken from a motionless camera at the site to provide a more detailed composite of an event or location.

The system can allow the ability to turn on a set of vehicles with cameras for recording video, sound, or other in a certain region. For example if a bank robbery is committed, the escape of the thief could be recorded by cameras on various vehicles. However the direction the thief is escaping may not be known and thus it may not be known which vehicles should be accessed. In accordance with an aspect of the invention, cameras in vehicles within expanding concentric circles (as time elapses) record to ensure all directions of possible escape are recorded. That is a contiguous array of location coordinates are entered defining the expanding concentric circles. The desired regions for recording are monitored by a computer from signals obtained from, for example, GPS systems in the vehicles to provide location information. Based on theses signals, recordings are accessed from relevant vehicles.

Alternatively, a signal may be sent to all vehicles and vehicles having an appropriate algorithm can determine whether it meets certain location coordinates and associated radius. That is, the vehicle would compare its current location with the region involved (for example, using Pythagorean math) to determine if it is inside the region (to record) or outside the region (to not record) to capture the information in the region specified.

The contiguous array of location coordinates can be used to define any desired area, e.g. based on a grid or a circle. The location coordinates can be provided as longitude and latitude. Other vehicle traits may be monitored, e.g., time, direction of travel, change in latitude, vehicle speed, temperature, weather conditions, etc. Such information would allow a variety of surveillance, for example, all vehicles traveling north at an upward angle of 20 degrees on a certain mountain range could be monitored to capture a collision between two planes. Other monitored traits may be useful such as camera angle, focal length, etc.

Additional topographical/geographical terrain information may also be taken into account, e.g., an impassable mountain range/canyon (e.g., Grand Canyon) would provide a boundary for the search region that is not circular, for instance semicircular.

The images may be accessed in real-time. However, images may be recorded to determine a past course of events, such as a car accident. For example, a general query is sent from a computer searching for vehicles that passed a given point in a target interval of time. These vehicles, if so programmed, send recorded video and corresponding GPS information to the computer where images of the particular event are filtered and reviewed.

The image data might become accessible by plugging the camera system in a car into a network cable in a garage, for example. The images or video would have a greater time delay, but the amount of wireless bandwidth required would be reduced. (Wireless bandwidth is much more expensive than downloading the data through a wired network e.g., house cable modem to internet to agency requesting the video information.

Alternatively, vehicle images, such as video recordings, are viewed in real-time in anticipation of an event occurring at a certain time and place such as in a car chase or a terrorist event. Moreover, a desired set of screens are collected from a set of vehicles at the point the vehicles pass the place for a given time interval.

The system may also be used to obtain footage of car chases, for example. When a police report comes in reporting a car chase on a highway, for example, the vehicles on the highway can be accessed and their cameras activated for monitoring the chase.

In addition to mobile camera systems, additional motionless cameras may be installed at fixed locations such as bridges at a fixed latitude, longitude, and altitude. Since location is fixed, a GPS unit would be unnecessary for these cameras. However, the images being transmitted should include a unique identifier and/or the location and time of the recording.

Such cameras may also operate continuously, or may take images at given intervals. Access to these cameras may be on an as-needed basis, periodically, or continuously. Such cameras may also be used to produce archive images to use as frames of reference for the video images taken from mobile vehicles.

Satellite images showing topography may also be used to provide a composite of the picture. The satellite would provide appropriate location coordinates for locating the position of the satellite when the images were taken as well as camera system data such as focal strength and lens information.

Archived images may be stored in databases of government agencies, such as the Port Authority, to use as reference points at a later time. Such images may be updated periodically to capture a location in different seasons or, for example, during different phases of construction or roadwork. These cameras are polled periodically to collect images of the desired location.

The system of the invention allows instant real-time access to a given location and may focus on a certain landmark or object. For example, by keying in a given landmark, the system polls vehicles within an area potentially capable of viewing the landmark. This is achieved using the GPS units that continuously transmit their location. Once the vehicles are identified, the image data is accessed from the camera unit in the vehicle. The camera may be run continuously or periodically. Alternatively, upon receipt of a request, the camera may be turned on.

Using an appropriate program, image data this is not helpful is disregarded. For example, the vehicle may be facing the wrong direction, i.e. away from the landmark or region of interest. Image data that is helpful is identified including the focal length of the cameral lens and angle of the camera. This image data is coordinated with the position identified by the GPS, longitude, latitude, and altitude.

The image data is combined from different sources, for example from several vehicles. Combining image data allows views from different angles and positions. The computer may correlate pictures taken from multiple sources, by using the location information from the GPS as well as camera information, such as focal length. For example, programs exist for splicing together overlapping images to provide a single image covering a larger area. Images can be lined up using digital imaging techniques, e.g., matched filter to align the images to allow the real-time or semi-real time video to be created.

The image data may provide sufficient information on its own. For instance, the images may be processed to look for an object of interest using existing software. A database accessible by the computer could include information such as descriptions or images of exemplary objects or descriptions of persons for comparison purposes. The image data may be compared to archived pictures to determine unusual objects or activity at the landmark. For example, a suspicious object may be visible from the image data that is not present in the archived pictures.

Figure 4:
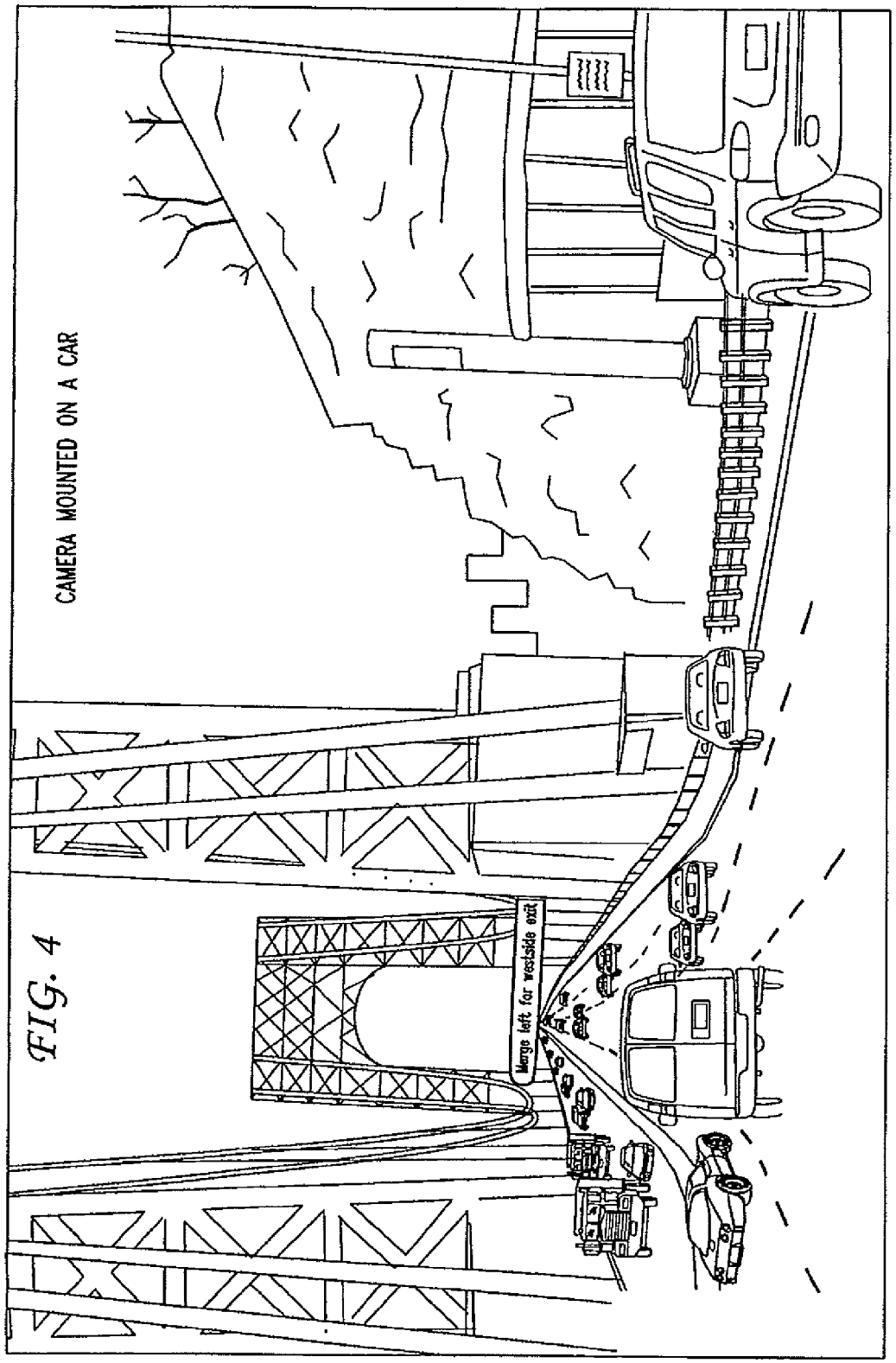
FIG. 4 depicts a view of a bridge from a camera mounted on a vehicle moving on the bridge in accordance with an embodiment of the invention.

The system of the invention could be useful during a catastrophe. For example, suppose the port Authority receives information that a fuel truck overturned on the George Washington Bridge. As much information as is available would need to be gathered and analyzed regarding the Bridge. With the system of the invention, a data base containing information of vehicles with camera systems and GPS units is accessed. The GPS data of the vehicles is polled, and if a vehicle is nearing the vicinity of the Bridge, or crossing the Bridge, the image data from the camera mounted on the vehicle can be viewed instantly and in real-time. For instance, FIG. 4 shows a camera mounted on a vehicle about to cross the Bridge.

The system of the invention can serially interleave frames or video captures from multiple sources. For example, there are three cars, A, B, C passing a spot on the George Washington Bridge moving in the same lane one behind each other, the following is what would be captured, retrieved, and serially strung together to create a video clip of that location for the time duration specified.

| Car | Time | Duration | Car Speed (mph) | Image Cont |
|---|---|---|---|---|
| A | 10:00:00.000 to 10:00:00.010 | 10 msec | 40 | 1 (image A1) |
| B | 10:00:00.010 to 10:00:00.050 | 40 msec | 10 | 4 (B1, B2, B3, B4) |
| C | 10:00:00.050 to 10:00:00.070 | 20 msec | 20 | 2 (C1, C2) |

The images can be combined to create a short video clip using frames: A1, B1, B2, B3, B4, C1, C2 to allow a 70 msec to capture the video at the associated location between the time of 10:00:00.000 and 10:00:00.070. Assuming the video capture rate in all three vehicles is the same, the number of frames captured moving past a certain locations would in general be inversely proportional to the speed of the car.

In addition to obtaining real-time images, historic GPS information can be reviewed to determine which vehicles have passed by, or crossed the Bridge, over a given time period. Based on the GPS information, recorded images from these vehicles can be accessed to view recorded images leading up to a truck overturning, for example. Such images would be useful for accident reconstruction.

Figure 5:
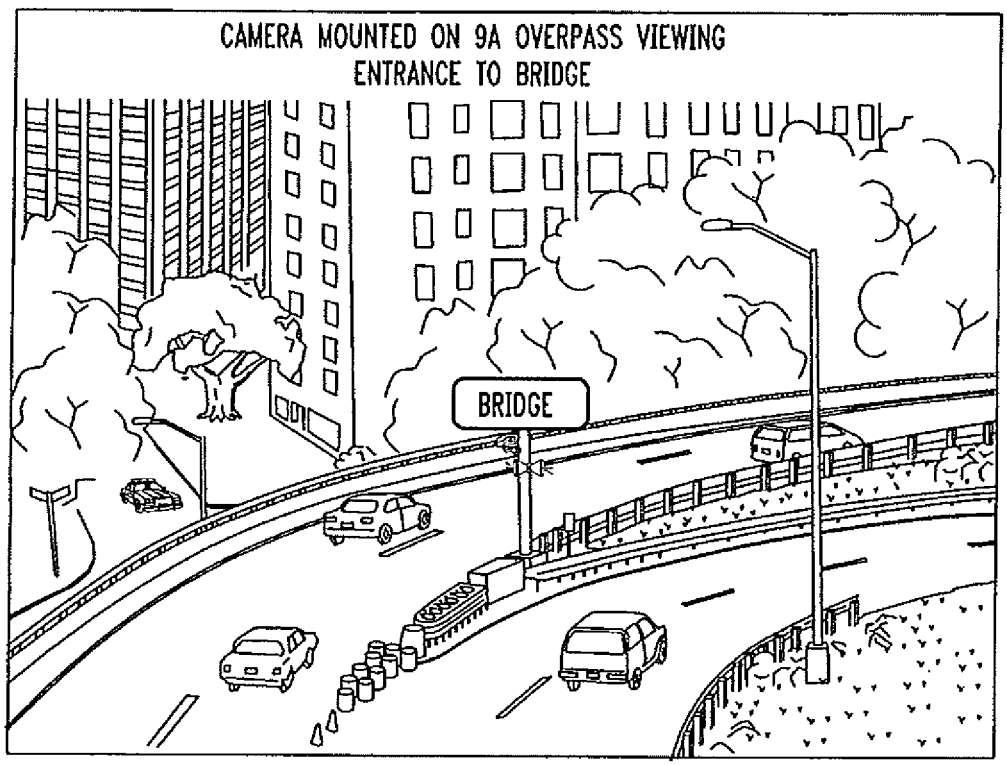
FIG. 5 depicts a view of the entrance to the bridge of FIG. 1 from a camera mounted on an overpass in accordance with an embodiment of the invention.
Figure 6:
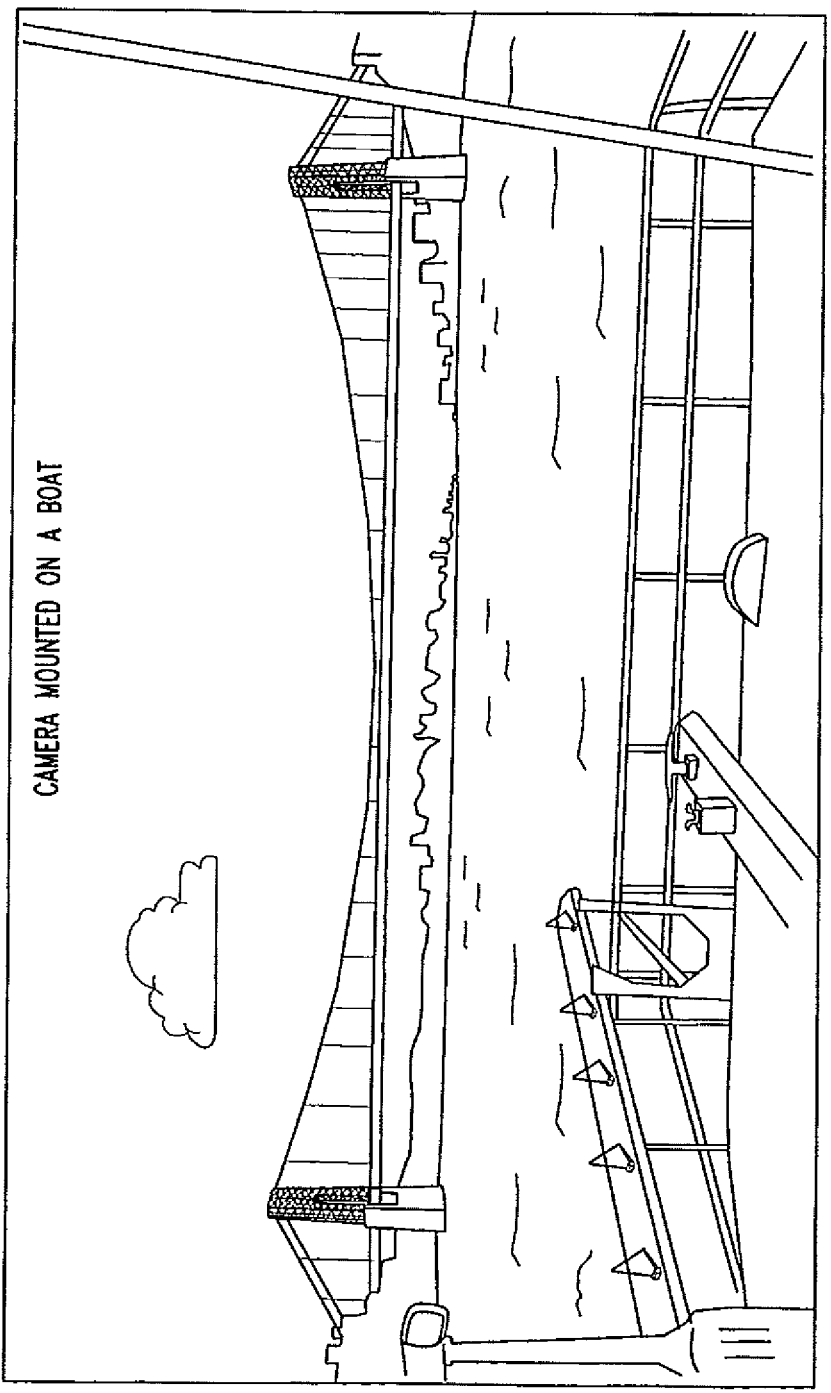
FIG. 6 depicts a view of a bridge from a camera mounted on a vehicle on the water in accordance with an embodiment of the invention.

Images data is obtained from as many sources as possible. For example, as shown in FIG. 6, image data location information, can be obtained from boats on the river below the Bridge. Moreover, stationary cameras, such as shown in FIG. 5, can be used for viewing the traffic at the entrance to the bridge.

A computer collects all of the information including image data including images and camera data such as focal lengths, and GPS coordinates and produces a file of images retrievable based on time and location. The collected images for a given time, latitude and longitude may be compared with known images in accordance with known techniques and filtered to eliminate those not containing some portion of the Bridge. (The camera could be pointed in the wrong direction or otherwise not capture the Bridge.)

Other uses than surveillance may come to mind of one of ordinary skill in the art.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A system for creating an image file using image data from multiple camera systems, the system comprising:
   a computer subsystem configured to:
      identify the multiple camera systems positioned within a target array of location coordinates by comparing location coordinates associated with a plurality of camera systems, including the multiple camera systems, to the target array of location coordinates, including identifying multiple mobile camera systems moving through a region of interest corresponding to the target array of location coordinates, as identified camera systems; and
      retrieve image data from the identified camera systems, the image data including images of the region of interest corresponding to the target array of location coordinates, including images of the region corresponding to the target array of location coordinates obtained by each mobile camera system when the mobile camera system was within the target array of location coordinates.

2. The system of claim 1, wherein the computer subsystem is further configured to create the image file using the image data retrieved from the identified camera systems.

3. The system of claim 2, wherein the computer subsystem, in being configured to create the image file, is further configured to identify unusual activity or an unusual object by comparing the image data retrieved from the camera systems to archived images.

4. The system of claim 2, wherein:
   the computer subsystem is configured to retrieve image data from at least one satellite system; and
   the computer subsystem, in being configured to create the image file, is configured to create the image file using the image data from the identified camera systems and the satellite system.

5. The system of claim 2, wherein the computer subsystem, in being configured to create the image file, is further configured to perform at least one processing step selected from a group of processing steps consisting of:
   comparing the image data retrieved from one of the mobile camera systems to image data retrieved from another one of the mobile camera systems; and
   combining the image data retrieved from one of the mobile camera systems to image data retrieved from another one of the mobile camera systems.

6. The system of claim 1, wherein:
   the identified camera systems include a stationary camera system in the region corresponding to the target array of location coordinates; and
   the image data retrieved from the stationary camera system includes images of the region corresponding to the target array of location coordinates obtained by the stationary camera system.

7. The system of claim 2, wherein:
   the identified camera systems include a stationary camera system in the region corresponding to the target array of location coordinates;
   the image data retrieved from the stationary camera system includes images of the region corresponding to the target array of location coordinates obtained by the stationary camera system; and
   the computer subsystem, in being configured to create the image file, is further configured to compare the image data retrieved from the mobile camera systems to the image data retrieved from the stationary camera system.

8. The system of claim 1, wherein:
   the array of location coordinates is a first array of location coordinates forming a first circle;
   the computer subsystem is further configured to, subsequent to identifying camera systems having location coordinates within the first array of location coordinates, identify camera systems having location coordinates within a second array of location coordinates including a second circle encompassing the first circle; and
   the computer subsystem is further configured to retrieve image data from camera systems identified as being within the second array of location coordinates.

9. The system of claim 2, wherein:
   the image data retrieved from each camera system of the identified camera systems includes at least one camera system characteristic selected from a group of characteristics consisting of:
      a focal length corresponding to the camera system; and
      a compass heading corresponding to the camera system; and
   the computer subsystem, in being configured to create the image file, is further configured to combine images of the image data retrieved from the identified camera systems using the location coordinates of the identified camera systems and at least one of the camera system characteristics.

10. The system of claim 1, wherein:
    the computer subsystem includes a memory;
    the image data retrieved from each camera system of the identified camera systems includes environmental condition information corresponding to the location coordinates of the camera system; and
    the computer subsystem is further configured to store the image data retrieved from the identified camera systems, including the environmental condition information, in the memory.

11. The system of claim 2, wherein the computer subsystem, in being configured to create the image file, is further configured to splice together overlapping images of the image data retrieved from the identified camera systems to create a single image covering an area larger than that an area covered by any one of the overlapping images.

12. The system of claim 2, wherein the computer subsystem, in being configured to create the image file, is further configured to align images of the image data retrieved from the identified camera systems in a string to create a real-time video of the region.

13. The system of claim 12, wherein the computer subsystem, in being configured to align images of the image data retrieved from the identified camera systems to create the real-time video, is configured to consider:
- the location coordinates for each mobile camera system, of the mobile camera systems;
- a speed at which each mobile camera system is moving past the region; and
- a time at which each mobile camera system is moving past the region.

14. The system of claim 2, wherein the computer subsystem, in being configured to create the image file, is further configured to identify relevant images of the images of the received image data by filtering the receive image data to eliminate images that do not contain a certain object.

15. The system of claim 2, wherein the computer subsystem, in being configured to create the image file, is further configured to identify relevant images of the images of the received image data by filtering the received image data to eliminate images that do not contain a certain area.

16. A system for creating an image file using image data from multiple camera systems, the system comprising:
- a computer subsystem configured to:
  - identify camera systems positioned within a target first array of location coordinates by comparing location coordinates associated with a plurality of camera systems, including the multiple camera systems, to the first target array of location coordinates, wherein first array of location coordinates forms a first circle;
  - subsequent to identifying the camera systems having location coordinates within the first array of location coordinates, identify camera systems having location coordinates within a second array of location coordinates including a second circle encompassing the first circle;
  - retrieve image data from the identified camera systems, the image data including images of the region of interest corresponding to the target array of location coordinates; and
  - retrieve image data from camera systems identified as being within the second array of location coordinates.

17. The system of claim 16, wherein the computer subsystem is further configured to create the image file using the image data retrieved from the identified camera systems.

18. A system for creating an image file using image data from multiple camera systems, the system comprising:
- a computer subsystem configured to:
  - identify the multiple camera systems positioned within a target array of location coordinates by comparing location coordinates associated with a plurality of camera systems, including the multiple camera systems, to the target array of location coordinates, wherein the identified camera systems include multiple mobile camera systems moving through the region corresponding to the target array of location coordinates;
  - retrieve image data from the identified camera systems, the image data including images of the region corresponding to the target array of location coordinates obtained by each mobile camera system of the mobile camera systems when each mobile camera system was within the target array of location coordinates; and
  - create the image file using the image data retrieved from the identified camera systems, including to perform at least one processing step selected from a group of processing steps consisting of:
    - comparing the image data retrieved from one of the mobile camera systems to image data retrieved from another one of the mobile camera systems; and
    - combining the image data retrieved from one of the mobile camera systems to image data retrieved from another one of the mobile camera systems.

19. The system of claim 18, wherein:
- the computer subsystem, in being configured to create the image file, is further configured to align images of the image data retrieved from the identified camera systems in a string to create a real-time video of the region;
- the computer subsystem, in being configured to align images of the image data retrieved from the identified camera systems to create the real-time video, is configured to consider:
  - the location coordinates for each mobile camera system, of the mobile camera systems;
  - a speed at which each mobile camera system is moving past the region; and
  - a time at which each mobile camera system is moving past the region.

20. The system of claim 18, wherein the computer subsystem is further configured to obtain, from external to the computer subsystem, a target array of location coordinates corresponding to a region of interest.

* * * * *